United States Patent
Kim et al.

(10) Patent No.: US 9,691,557 B2
(45) Date of Patent: Jun. 27, 2017

(54) FREE-STANDING HYBRID NANOMEMBRANE AS ENERGY STORAGE ELECTRODE AND THE FABRICATION METHOD THEREOF

(71) Applicant: IUCF-HYU (Industry-University Cooperation Foundation Hanyang University), Seoul (KR)

(72) Inventors: Seon Jeong Kim, Seoul (KR); Shi Hyeong Kim, Seoul (KR); Min Kyoon Shin, Seoul (KR); Jae Ah Lee, Seoul (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 87 days.

(21) Appl. No.: 14/727,349

(22) Filed: Jun. 1, 2015

(65) Prior Publication Data

US 2015/0294800 A1    Oct. 15, 2015

Related U.S. Application Data

(62) Division of application No. 13/710,796, filed on Dec. 11, 2012, now Pat. No. 9,251,968.

(51) Int. Cl.
| H01G 11/36 | (2013.01) |
| H01G 11/48 | (2013.01) |
| H01G 11/86 | (2013.01) |
| B82Y 30/00 | (2011.01) |

(52) U.S. Cl.
CPC ............ *H01G 11/36* (2013.01); *H01G 11/48* (2013.01); *H01G 11/86* (2013.01); *B82Y 30/00* (2013.01); *Y02E 60/13* (2013.01)

(58) Field of Classification Search
None
See application file for complete search history.

(56) References Cited

U.S. PATENT DOCUMENTS

| 2003/0077515 A1 | 4/2003 | Chen et al. |
| 2008/0170982 A1 | 7/2008 | Zhang et al. |
| 2011/0304964 A1 | 12/2011 | Fleischer et al. |
| 2014/0376158 A1* | 12/2014 | Kim ...................... H01G 11/24 361/502 |

OTHER PUBLICATIONS

Cheng, W., et al., "*Freestanding ultrathin nano-membranes via self-assembly*;" nanotoday, vol. 4, No. 6; dated Dec. 2009; pp. 482-493.

(Continued)

*Primary Examiner* — Dion R Ferguson
(74) *Attorney, Agent, or Firm* — Alston & Bird LLP

(57) ABSTRACT

Disclosed is a free-standing hybrid nanomembrane capable of energy storage. The free-standing hybrid nanomembrane includes carbon nanotube sheets and a conducting polymer coated on the carbon nanotube sheets. The carbon nanotube sheets are densified sheets formed by evaporating an alcohol from carbon nanotube aerogel sheets. The conducting polymer is coated on the carbon nanotube sheets by vapor phase polymerization. Further disclosed is a method for fabricating the free-standing hybrid nanomembrane.

7 Claims, 8 Drawing Sheets

(56) References Cited

OTHER PUBLICATIONS

Elbaccouch, M., et al.; "Microstructural analysis of doped-strontium cerate thin film membranes fabricated via polymer precursor technique;" Solid State Ionics, vol. 178, No. 1-2; pp. 19-28; dated Jan. 2007.
Fukao, N., et al.; "Automatic Spray-LBL Machine Based on in-Situ QCM Monitoring;" Macromolecules, vol. 44, No. 8; pp. 2964-2969; dated Apr. 2011.
Gonzalez-Perez, A., et al.; "Biometric triblock copolymer membranes: from aqueous solutions to solid supports;" Soft Matter, vol. 7, No. 3; pp. 1129-1138; dated Dec. 2010.
Jiang, C., et al.; "Self-recovery of stressed nanomembranes;" Applied Physics Letters, vol. 86, No. 12; p. 121912.
Kang, T., et al., "Ultra-thin and Conductive Nanomembrane Arrays for Nanomechanical Transducers;" Advanced Materials, vol. 20, No. 16; pp. 3131-3137.
Singamaneni, S., et al.; "Robust Fluorescent Response of Micropatterned Multilayered Films;" Journal of Macromolecular Science, vol. 46, No. 1; pp. 7-19; dated Apr. 2007; retrieved on Mar. 5, 2013 from <http://www.google.com/search?q=Robust+Fluorescent+Response+of+Micropatterned+Multilayered+Films&rls=com.microsoft:en-us&ie=UTF-8&oe=UTF-8&startIndex=&startPage=1>.
Zhao, D., et al.; "Multiphase Assembly of Mesoporous-Macroporous Membranes;" Chemistry of Materials, vol. 11, No. 5; pp. 1174-1178; dated Apr. 1999; retrieved on Mar. 5, 2013 from <www.chemengr.ucsb.edu/~ceweb/faculty/bradc/pdfs/19.pdf>.

\* cited by examiner

FREE-STANDING HYBRID NANOMEMBRANE AS ENERGY STORAGE ELECTRODE AND THE FABRICATION METHOD THEREOF

CROSS-REFERENCE TO RELATED APPLICATIONS

This application is a divisional of U.S. application Ser. No. 13/710,796, filed Dec. 11, 2012, which is hereby incorporated herein in its entirety by reference.

BACKGROUND OF THE INVENTION

1. Field of the Invention

The present invention relates to a nanomembrane and a fabrication method thereof. More specifically, the present invention relates to a free-standing hybrid nanomembrane capable of energy storage in which a conducting polymer is coated on densified carbon nanotube sheets, and a method for fabricating the free-standing hybrid nanomembrane.

2. Description of the Related Art

Freely suspended ultrathin (thickness <100 nm) membranes promise applicability of many types of sensors, actuators, optical devices, fuel cells, scaffolds for the organization of nanoparticles, and separation of biological macromolecules. Several approaches have been carried out for the fabrication of free-standing nanomembranes from polymers and/or from inorganic materials: spin casting of films, (*Solid-state ionics* 2007, 178, 19) layer-by-layer assembly of polyelectrolytemulti-layers, (*Macromolecules* 2011, 44, 2966) crosslinking of self-assembled monolayers, (*Nano today* 2009, 4, 4829) and assembly of triblockcopolymers (*Chem. Mater.* 1999, 11, 1174, *Soft Matter* 2011, 7, 1129). For mechanically robust and electrically conductive nanomembranes, nanoparticles such as gold nanoparticles or carbon nanotubes have been embedded in the films (*Macromolecular science, part B: Physics,* 2007, 46, 7, *Adv. Mater.* 2008, 20, 3131).

However, most methods are often time consuming, and have some limitations in electrical and electrochemical performances, and scale-up. Thereby, efficient alternative methods for the preparation of robust, free-standing and conductive nanomembranes with the capability of being produced in large dimensions are highly desired.

SUMMARY OF THE INVENTION

It is an object of the present invention to provide a mechanically robust, electrically conductive, free-standing and transparent hybrid nanomembrane with high electrochemical capacitance that is based on densified ultrathin carbon nanotube sheets (CNSs) and a conducting polymer coated on the CNSs by vapor phase polymerization (VPP), and a method for fabricating the hybrid nanomembrane.

It is a further of the present invention to provide an energy storage electrode, such as a supercapacitor, which includes the hybrid nanomembrane.

According to an aspect of the present invention, there is provided a free-standing hybrid nanomembrane capable of energy storage including carbon nanotube sheets and a conducting polymer coated on the carbon nanotube sheets wherein the carbon nanotube sheets are densified sheets formed by evaporating an alcohol from carbon nanotube aerogel sheets, and the conducting polymer is coated on the carbon nanotube sheets by vapor phase polymerization.

In an embodiment of the present invention, the carbon nanotube sheets may consist of one or two layers.

In a further embodiment of the present invention, the conducting polymer is preferably present in an amount of 30 to 90% by weight and may be, for example, poly(3,4-ethylenedioxythiophene), polyaniline, polypyrrole, polyethylene, or polythiophene.

The hybrid nanomembrane of the present invention may be free-standing in liquid and its sheet shape is maintained at the liquid/air interface.

In an embodiment of the present invention, the free-standing hybrid nanomembrane has an electrochemical capacitance of 60 to 200 F/g at 10 mV/s in the potential range of −0.2 to 0.8 V, a mechanical strength of 120 to 150 MPa, and a modulus of 8 to 18 GPa.

In an embodiment of the present invention, the carbon nanotube sheets constituting the free-standing hybrid nanomembrane may be formed on a transparent conducting substrate, for example, a poly(ethylene terephthalate) (PET) substrate.

In an embodiment of the present invention, the free-standing hybrid nanomembrane has a thickness of 60 to 120 nm.

According to another aspect of the present invention, there is provided a method for fabricating a hybrid nanomembrane in which a conducting polymer is coated on carbon nanotube sheets, the method including 1) allowing an oxidant solution including Fe(III)PTS, pyridine and butanol to flow on carbon nanotube sheets, and completely evaporating the butanol, and 2) dropping a monomer for a conducting polymer polymerization on areas that are not in direct contact with the carbon nanotube sheets stained with the oxidant solution free from butanol, followed by vapor phase polymerization in a sealed state.

In an embodiment of the present invention, the method may further include 3) rinsing the hybrid nanomembrane to remove unreacted oxidants after step 2).

In an embodiment of the present invention, the carbon nanotube sheets are preferably densified sheets formed by evaporating an alcohol from carbon nanotube aerogel sheets, and the monomer for the conducting polymer may be, for example, ethylenedioxythiophene (EDOT).

The concentration of the Fe(III)PTS in the oxidant solution is preferably from 6 to 20% by weight, based on the weight of the butanol.

The alcohol is preferably evaporated at 40 to 60° C. in step 1), and the polymerization is preferably carried out at around 60° C. in step 2).

According to yet another aspect of the present invention, there is provided an energy storage electrode, such as a supercapacitor, which includes the free-standing hybrid nanomembrane.

The robust and free-standing conductive nanomembrane of the present invention is based on CNSs and a conducting polymer. The hybrid nanomembrane has a sheet resistance below 200 Ω/sq at a thickness of about 66 nm and shows moderate optical transparency, high flexibility and a bending resistance change of below 0.1%. In addition, electrochemical capacitance of the hybrid nanomembrane is 10 times higher than that of bare CNSs due to effective hybridization of the CNSs and the conducting polymer as well as its area density as low as 30 μg/cm². Furthermore, the hybrid nanomembrane is applicable to sensors, actuators, optical devices, fuel cells as well as electrochemical capacitors.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
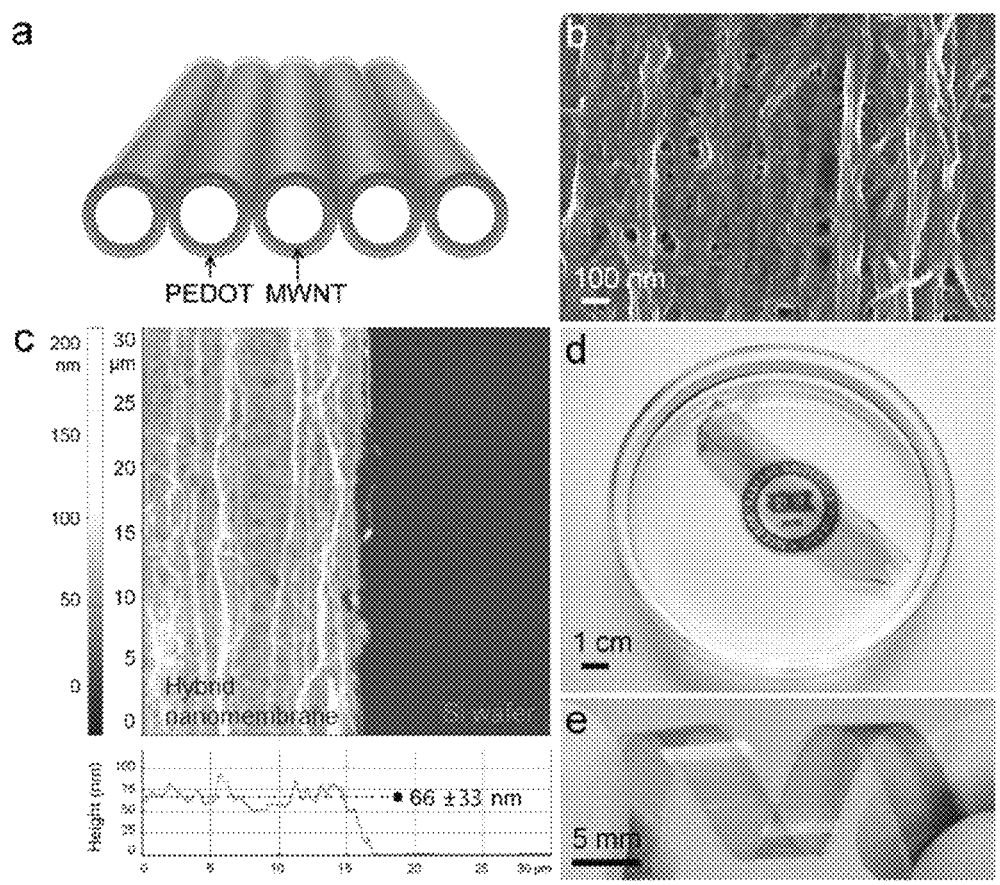
FIG. 1 shows a) a schematic representation of a PEDOT-coated CNS nanomembrane according to an embodiment of the present invention, b) a scanning electron microscope image showing a morphology of a hybrid nanomembrane, c) an atomic force microscopy image showing a surface morphology and a height profile of a hybrid nanomembrane with an average thickness of 66 nm on a Si wafer, in which the thickness deviation of the hybrid nanomembrane was determined from root-mean-square of heights, d) a photo image of a free-standing and optically transparent hybrid nanomembrane in ethanol, and e) an photo image of a helically twisted hybrid nanomembrane/PET film.

The present invention will now be described in detail.

The present invention provides a free-standing hybrid nanomembrane capable of energy storage including carbon nanotube sheets and a conducting polymer coated on the carbon nanotube sheets wherein the carbon nanotube sheets are densified sheets formed by evaporating an alcohol from carbon nanotube aerogel sheets, and the conducting polymer is coated on the carbon nanotube sheets by vapor phase polymerization.

In an embodiment of the present invention, the carbon nanotube sheets may consist of one or two layers.

In a further embodiment of the present invention, the conducting polymer is preferably present in an amount of 30 to 90% by weight. The presence of the conducting polymer in an amount of less than 30% by weight increases the risk that the sheets may be torn and causes a dramatic decrease in capacitance. Meanwhile, the presence of the conducting polymer in an amount of more than 90% by weight leads to a great reduction in transparency and a decrease in capacitor efficiency per unit weight. Examples of conducting polymers suitable for use in the hybrid nanomembrane of the present invention include, but are not limited to, poly(3,4-ethylenedioxythiophene), polyaniline, polypyrrole, polyethylene, and polythiophene.

The hybrid nanomembrane of the present invention can be free-standing in liquid and its sheet shape is maintained at the liquid/air interface.

In an embodiment of the present invention, the electrochemical capacitance of the hybrid nanomembrane measured at 10 mV/s in the potential range of −0.2 to 0.8 V is from 60 to 200 F/g, which is high when compared to that of a CNT/PEDOT film having a similar thickness (<60 nm) (~33 F/g).

In an embodiment of the present invention, the hybrid nanomembrane has a mechanical strength of 120 to 150 MPa and a modulus of 8 to 18 GPa. The mechanical strength of the hybrid nanomembrane is about 3 times higher than that of a PEDOT/PSS film with a thickness of 30 µm (43 MPa). Moreover, the strength and modulus of the hybrid nanomembrane exceed those of recently developed nanomembranes prepared by self-assembly (elastic moduli of 1 to 10 GPa and ultimate strengths of up to 100 MPa). This indicates that the hybrid nanomembrane is structurally stable and is mechanically robust enough to handle despite its nanoscale thickness.

In an embodiment of the present invention, the carbon nanotube sheets constituting the free-standing hybrid nanomembrane may be formed on a transparent conducting substrate, for example, a poly(ethylene terephthalate) (PET) substrate.

In an embodiment of the present invention, the free-standing hybrid nanomembrane has a thickness of 60 to 120 nm, which can be considered as falling within the scope of 'nanomembrane.'

The present invention also provides a method for fabricating a hybrid nanomembrane in which a conducting polymer is coated on carbon nanotube sheets, the method including a method for fabricating a hybrid nanomembrane in which a conducting polymer is coated on carbon nanotube sheets, the method including 1) allowing an oxidant solution including Fe(III)PTS, pyridine and butanol to flow on carbon nanotube sheets, and completely evaporating the butanol, and 2) dropping a monomer for a conducting polymer polymerization on areas that are not in direct contact with the carbon nanotube sheets stained with the oxidant solution free from butanol, followed by vapor phase polymerization in a sealed state.

In an embodiment of the present invention, the method may further include 3) rinsing the hybrid nanomembrane to remove unreacted oxidants after step 2).

In an embodiment of the present invention, the carbon nanotube sheets are densified sheets formed by evaporating an alcohol from carbon nanotube aerogel sheets and the monomer for the conducting polymer may be, for example, ethylenedioxythiophene (EDOT).

The concentration of the Fe(III)PTS in the oxidant solution is preferably from 6 to 20% by weight, based on the weight of the butanol. At a concentration of less than 6% by weight, dramatic decrease of capacitance is caused. Meanwhile, at a concentration of more than 20% by weight, a great reduction in transparency, an increase in thickness, and a decrease in capacitor efficiency per unit weight are caused.

In the method of the present invention, the alcohol is preferably evaporated at 40 to 60° C. At a temperature lower than 40° C., it takes a long time to completely evaporate the alcohol. In step 2), the polymerization is carried out at 60° C. Depending on the polymerization temperature, the evaporation rate of ethylenedioxythiophene (EDOT) is varied, and as a result, the coating conditions may be varied.

The free-standing hybrid nanomembrane of the present invention is applicable to energy storage electrodes, such as supercapacitors, due to its very high capacitance.

The present invention will be explained in detail with reference to the following examples. These examples are provided to assist in further understanding of the invention and are not intended to limit the scope of the invention.

EXAMPLES

Example 1: Fabrication of Hybrid Nanomembranes

In this example, transparent and conductive hybrid membranes were fabricated that are stable in liquid or at the liquid/air interface. CNSs densified by an oxidant solution were polymerized with poly(3,4-ethylenedioxythiophene) (PEDOT) employing (VPP), as shown in FIG. 1a. The stacked CNSs by VPP were optically transparent, had a thickness of below 100 nm, and consisted of one or two-layer carbon nanotube aerogel sheets.

Because the high electrical conductivity, optical transparency, chemical stability and electrochemical catalytic property, PEDOT has been considered for applications including electrochemical/mechanical sensors, transparent electrodes, and fuel cell membranes. Therefore, in this example, PEDOT was employed to fabricate transparent hybrid membranes.

First, aligned arrays of carbon multi-walled nanotubes (MWNT forests) were grown on a Si wafer using a conventional chemical vapor deposition method. Iron(III)p-toluenesulfonatehexahydrate (Fe(III)PTS, $M_w$: 677.52), pyridine (anhydrous, 99.8%), 1-butanol (for molecular biology, ≥99%), and 3,4-ethylenedioxythiophene (EDOT) monomer (97%) were purchased from Sigma-Aldrich (USA). 2N sulfuric acid solutions (1M $H_2SO_4$) were purchased from Daejung chemicals (South Korea).

0.1 mL of pyridine was added to a 20 wt % Fe(III)PTS/butanol solution and dissolved with stirring using a magnetic bar or by sonication to prepare a Fe(III)PTS/pyridine/butanol solution. The Fe(III)PTS/pyridine/butanol solution was diluted with butanol to prepare solutions having various concentrations ranging from 1 to 8 wt % oxidant. Each of the diluted solutions were allowed to flow on slideglass, on which one or two superimposed sheets of well-aligned carbon multi-walled nanotubes (MWNT) had been placed and dried in an oven at 60° C. to completely evaporate the butanol. The ethylenedioxythiophene (EDOT) monomer was dropped on both the sides around the MWNT CNSs stained with the oxidant solution, and then the sample was sealed. Vapor phase polymerization was carried out at 60° C. for 1 hour. After polymerization, the nanomembrane was thoroughly rinsed several times in ethanol to remove unreacted oxidants.

The surface morphology and height profiles of the hybrid nanomembranes were taken using scanning electron microscopy (Hitachi S4700, Japan) and atomic force microscopy (Park Systems XE-100, South Korea). Galvanostatic, potentiostatic, and electrochemical impedance measurements were performed employing a Gamry instrument (USA). Two-probe sheet resistance measurements were performed using a digital multimeter (Fluke Corporation, Model 187, USA), and two-probe bending resistance changes were measured using a home-made bending-recovery device.

FIG. 1 shows PEDOT/CNSs hybrid nanomembranes prepared by VPP. In FIG. 1, a) is a schematic representation of a PEDOT-coated CNS nanomembrane. b) is a scanning electron microscope image showing a morphology of a hybrid nanomembrane. c) is an atomic force microscopy image showing a surface morphology and a height profile of a hybrid nanomembrane with an average thickness of 66 nm on a Si wafer. The thickness deviation of the hybrid nanomembrane was determined from root-mean-square of heights. d) is a photo image of a free-standing and optically transparent hybrid nanomembrane in ethanol. e) is an photo image of a helically twisted hybrid nanomembrane/PET film. The hybrid nanomembrane was directly attached on a PET film by VPP without transfer. All samples were prepared from densified 1-layer CNS, and loading of PEDOT in the hybrid nanomembranes was 85 wt %.

Figure 2:
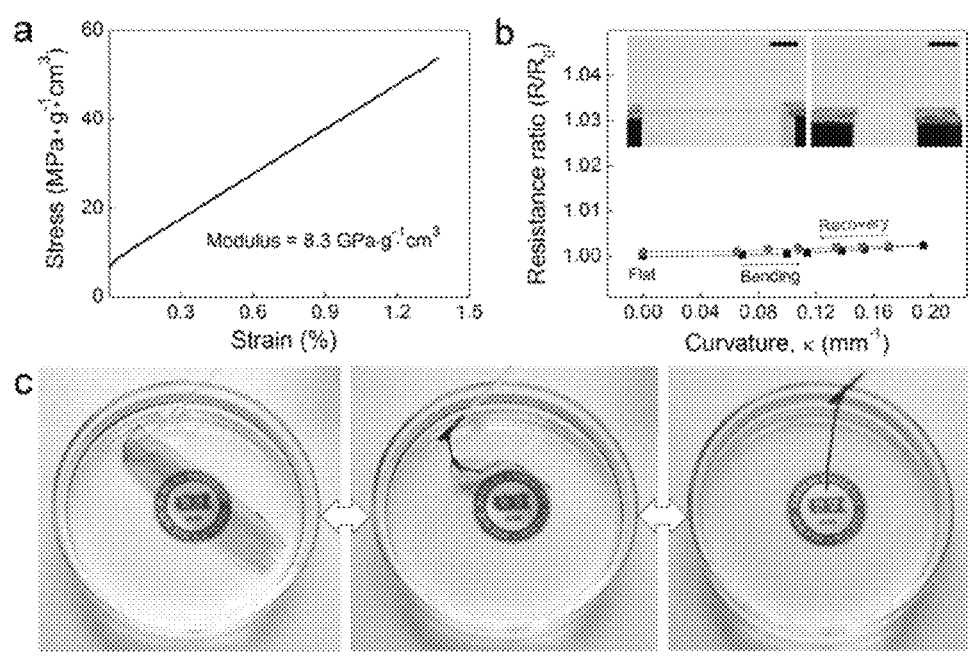
FIG. 2 shows a) a stress-strain curve of a hybrid nanomembrane according to an embodiment of the present invention, b) an electrical resistance variation of a hybrid nanomembrane attached on a PET film caused by curvature changes of 0 to 0.2 $mm^{-1}$, in which the plotted resistances are average values obtained from three cycles and the inset shows flat and bent samples (Scale bar: 1 cm), and c) photo images showing shape reversibility of a hybrid nanomembrane.

FIG. 2 shows high mechanical and structural robustness of a hybrid nanomembrane of the present invention. In FIG. 2, a) shows a stress-strain curve of a hybrid membrane. b) shows an electrical resistance variation of a hybrid nanomembrane attached on a PET film caused by curvature changes of 0 to 0.2 $mm^{-1}$. The plotted resistances are average values obtained from three cycles. The inset shows the flat and bent samples (Scale bar: 1 cm).

In FIG. 2, c) shows photo images showing shape reversibility of a hybrid nanomembrane: free-standing nanomembrane in liquid (left), nanomembrane at liquid/air interface (middle), and collapsed nanomembrane in air (right). The arrows indicate that shape recovery of a collapsed nanomembrane is possible by re-immersing the membrane in liquid. PEDOT weight percent was 85%, and 1-layer CNS was used for the hybrid nanomembrane preparation.

Figure 3:
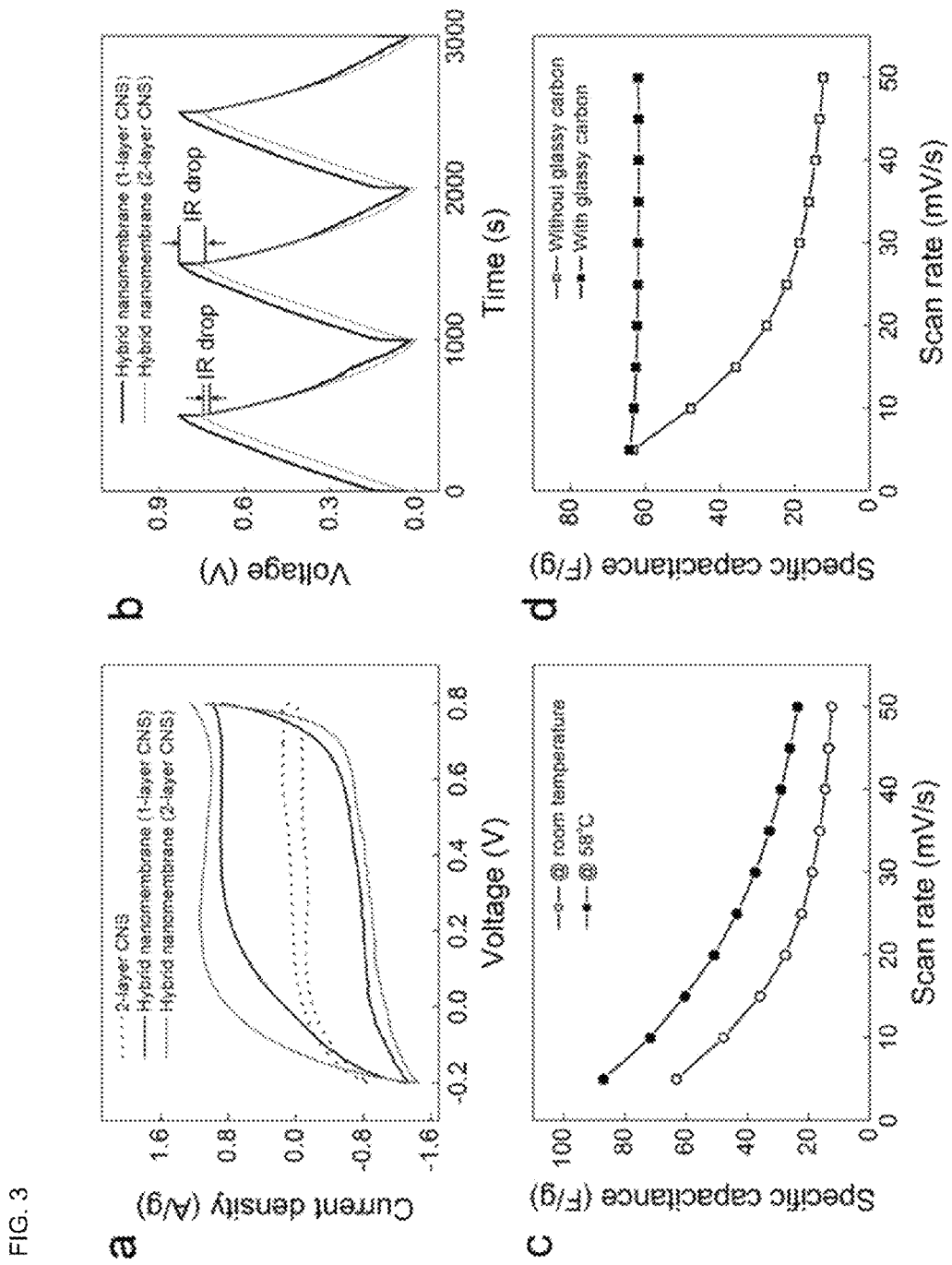
FIG. 3 graphically shows the electrochemical capacitance performance of hybrid nanomembranes according to embodiments of the present invention, a) cyclic voltammograms (current density versus voltage) for hybrid nanomembranes with 1 and 2-layer CNSs and 2-layer CNSs, b) galvanostatic charge-discharge (voltage versus time) curves for a 1-layer CNS/PEDOT nanomembrane at a current density of 0.14 A/g and a 2-layer CNSs/PEDOT nanomembrane at a current density of 0.16 A/g, c) specific capacitances of hybrid nanomembranes according to different scan rates (5 to 50 mV/s) at room temperature and 58° C., and d) specific capacitances of hybrid nanomembranes attached on a glassy carbon electrode and hybrid nanomembranes without a glassy carbon electrode, in which the PEDOT weight percent of all the hybrid nanomembranes was 85%.

FIG. 3 shows the electrochemical capacitance performance of hybrid nanomembranes. In FIG. 3, a) shows cyclic voltammograms (current density versus voltage) for hybrid nanomembranes with 1 and 2-layer CNSs and 2-layer CNSs. b) shows galvanostatic charge-discharge (voltage versus time) curves for a 1-layer CNS/PEDOT nanomembrane at a current density of 0.14 A/g and a 2-layer CNSs/PEDOT nanomembrane at a current density of 0.16 A/g. c) shows specific capacitances of hybrid nanomembranes according to different scan rates (5 to 50 mV/s) at room temperature and 58° C. d) shows specific capacitances of hybrid nanomembranes attached on a glassy carbon electrode and hybrid nanomembranes without a glassy carbon electrode. The PEDOT weight percent of all the hybrid nanomembranes was 85%.

Figure 4:
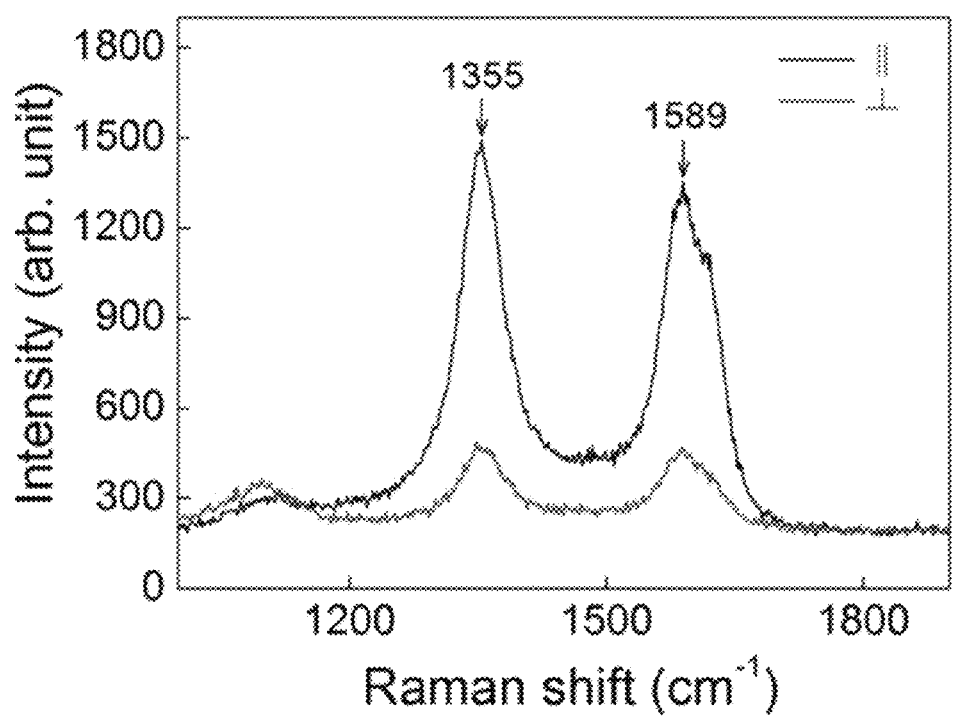
FIG. 4 shows polarized Raman spectra of a densified 1-layer CNS, in which a VV configuration (parallel polarization for incident light and Raman signal) was used, with polarization parallel to (∥) or perpendicular to (⊥) the draw direction of the nanotube sheets.

Densified nanoscale thin CNSs played a role as a highly conductive and transparent matrix. Previously, the preparation of conductive PEDOT nanomembranes on insulating Goretex substrates required additional gold coating before PEDOT polymerization for a stable electrical connection between PEDOT polymers. However, CNSs used in the present invention enable direct polymerization of PEDOT for conductive nanomembranes due to the well-aligned carbon nanotubes with high electrical conductivity. Aligned structures of CNTs in densified CNS by butanol used in the present invention were confirmed from polarized Raman spectroscopy (FIG. 4).

This direct coating without gold wiring is a very significant factor to obtain high specific electrochemical capacitance and low area density. Such CNSs were densified from 1 or 2-layer carbon nanotube aerogel sheets by the flow of a dilute oxidant solution (8 wt % oxidant in butanol), and small amount of oxidant deposition generated ultrathin layer structures with distinct carbon nanotube/PEDOT fibrous morphology after VPP (FIG. 1b).

Figure 5:
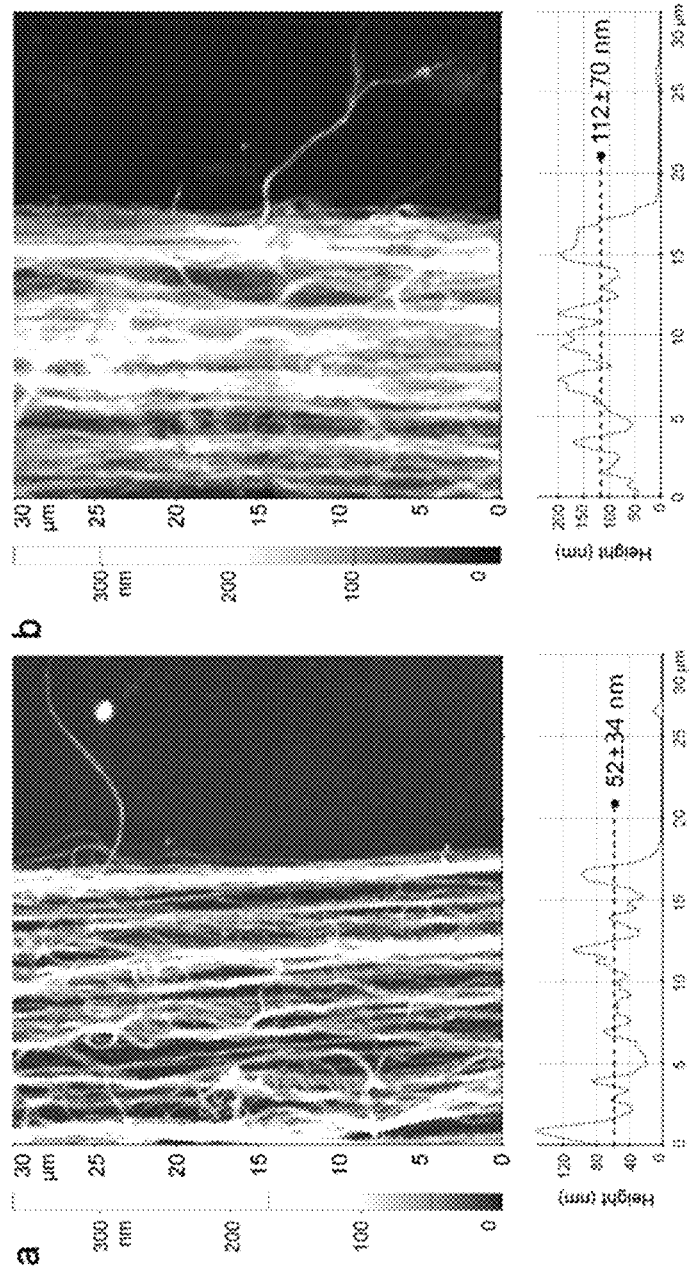
FIG. 5 shows atomic force microscopy images showing surface morphology and height profile, a) bare CNSs with an average thickness of 52 nm on a Si wafer, b) a 2-layer CNS/85 wt % PEDOT nanomembrane with an average thickness of 112 nm on a Si wafer, in which the thickness deviation was determined from root-mean-square of heights.

The PEDOT weight percent of hybrid nanomembranes were controllable by oxidant concentration in solutions, and 85 wt % PEDOT was coated on 1-layer CNS using an 8 wt % oxidant solution. The resultant hybrid nanomembranes with 85 wt % PEDOT had thickness of average ~66 nm as shown in FIG. 1c. The average thickness of 1-layer CNS/85 wt % PEDOT nanomembrane was larger than that of 1-layer CNS densified by butanol (~52 nm) and smaller than that of 2-layer CNS/85 wt % PEDOT nanomembrane (~112 nm) (FIG. 5).

Figure 6:
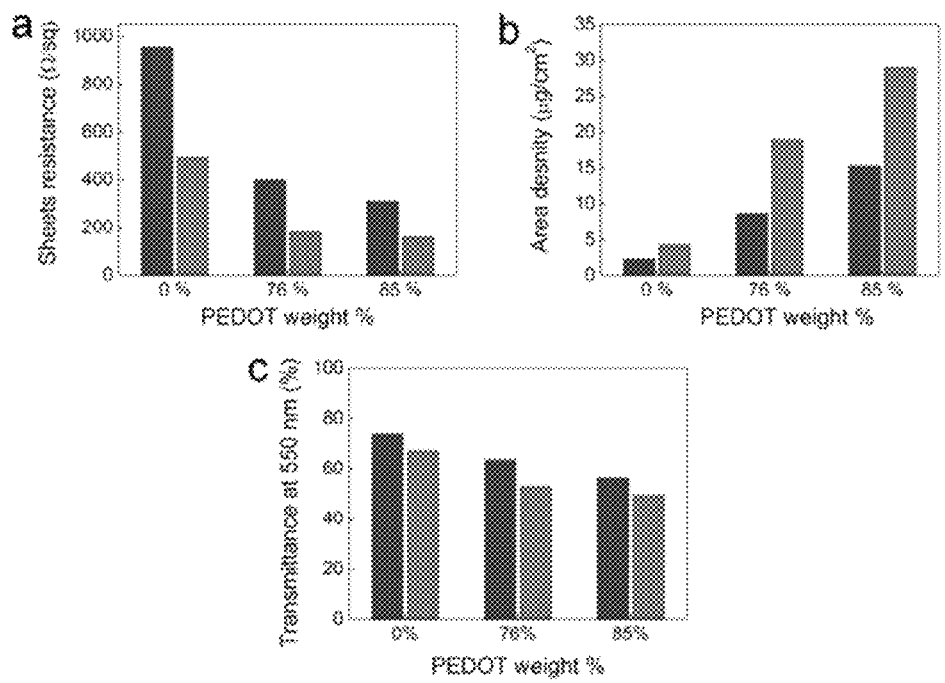
FIG. 6 shows a) electrical sheet resistance, b) area density, and c) transmittance at a wavelength of 550 nm with different layers of CNSs and PEDOT weight: 1-layer CNS/PEDOT nanomembranes are blue rectangles and 2-layer CNS/PEDOT nanomembranes are red rectangles.

Electrical conductance of hybrid nanomembranes was enhanced with the increase of PEDOT weight percent (FIG. 6a). The hybrid nanomembrane consisting of 85 wt % PEDOT and 1-layer CNS had a sheet resistance of 312 W/sq, and the value was three times lower than that of 1-layer CNS densified by butanol (958 W/sq). The dramatic decrease of sheet resistances is attributed to nanoscale thin PEDOT polymers filling spaces between individual CNTs as shown in FIGS. 1b and 1c. The sheet resistance of hybrid nanomembranes was further decreased when 2-layer CNSs were used as a substrate for PEDOT polymerization. The sheet resistance was then 163 W/sq at 85 wt % PEDOT coating. The sheet resistance was half that of the 1-layer CNS/85 wt % PEDOT sample. The reduced sheet resistance is related to the increase of area density (FIG. 6b), since the area density of the 2-layer CNS/85 wt % PEDOT nanomembrane (29 µg/cm$^2$) was almost double compared to that of 1-layer CNS/85 wt % PEDOT nanomembrane (15 µg/cm$^2$). Although multi-layer stacked CNS samples (over 3 layers) can further increase the sheet conductance of the hybrid nanomembranes, the thickness and the area density of hybrid membranes were also increased, resulting in a loss of their transparency.

The hybrid nanomembrane peeled off on a glass slide after VPP was optically transparent and free-standing in ethanol (FIG. 1d). The transmittance spectra at wavelength of 550 nm were obtained from hybrid nanomembranes with different PEDOT loading (FIG. 6c). The transmittance of the hybrid nanomembrane (85 wt % PEDOT and 1-layer CNS) was 56% and this value was 18% lower than that of the 1-layer CNS densified by butanol (74%). The reduced transmittance of the hybrid membrane is due to decreased porosity between the CNTs caused by PEDOT polymerization and also due to the increased membrane thickness. However, the hybrid nanomembrane still has reasonable optical transparency (FIGS. 1d and 1e).

The hybrid nanomembrane can be directly prepared on a flexible and transparent substrate such as poly(ethylene terephthalate) (PET) without the need for a membrane transfer process. The flexibility of the hybrid membrane/PET film and good adhesion between the hybrid nanomembrane and PET substrate enabled the laminate to survive twisting into a helical shape without severe structural damage (FIG. 1e).

To investigate mechanical and structural robustness of hybrid nanomembranes, various tensile and bending tests in liquid and at a liquid/air interface were carried out. FIG. 2a shows a stress-strain curve of a hybrid nanomembrane consisting of 1-layer CNS/85 wt % PEDOT. The density normalized mechanical strength and modulus of hybrid nanomembranes were 51±3 MPa/(g/cm$^3$) and 5.1±2.9 GPa/(g/cm$^3$), respectively. When mechanical properties were calculated using the average thickness of the hybrid nanomembranes (obtained from AFM), the mechanical strength and modulus were 135±8 MPa and 12.6±5.3 GPa, respectively. This mechanical strength was ~3 times higher than that of PEDOT/PSS film with thickness of 30 mm (43 MPa). Moreover, the strength and modulus of 1-layer CNS/85 wt % PEDOT nanomembrane exceeded those of the recently developed nanomembranes prepared by self-assembly (elastic moduli of 1-10 GPa and ultimate strengths of up to 100 MPa). (*Appl. Phys. Lett.* 2005, 86, 121912)

The electrical resistance changes of hybrid nanomembranes with 1-layer CNS/85 wt % PEDOT during bending of the hybrid/PET laminate were also investigated using a home-made bending device (FIG. 2b). The electrical resistance changes were below 0.1% up to a bend curvature of 0.2 mm$^{-1}$. Generally, conducting polymers are very brittle, particularly in nanoscale thin films. The brittleness often generates dramatic increases of resistance by deformation such as bending. Almost complete recovery of bending resistances in hybrid nanomembranes reflects that CNTs composing CNSs provide flexibility without structural damage during deformation.

Figure 7:
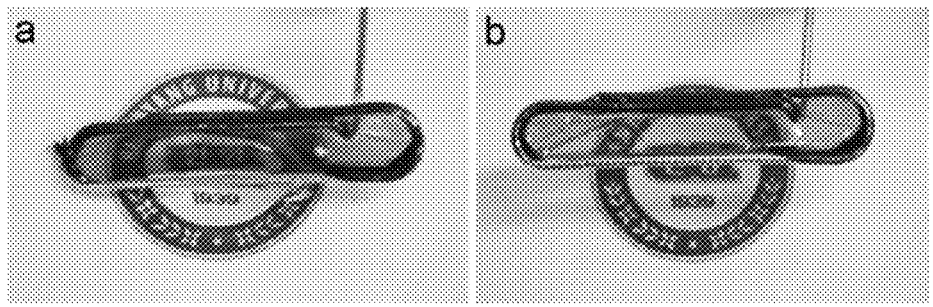
FIG. 7 shows photo images showing hybrid nanomembranes attached on a paper clip-wire in liquid and air, a) the hybrid nanomembrane was partially immersed into ethanol, and b) the hybrid nanomembrane passed through an ethanol/air interface without severe structural deformation.

CNSs have difficulties in maintaining their sheet shape in liquid without a supporting substrate because of a collapsing phenomenon induced by their small buckling threshold and van der Waals interactions between individual CNTs. Moreover, CNSs that collapse at a liquid/air interface do not recover their original shape when they are immersed in liquid again. Unlike CNSs, the hybrid nanomembranes of the present invention completely recovered their shape when there were wetted again in liquid (before complete dry) although the hybrid nanomembranes were collapsed by surface tension at liquid/air interface (FIG. 2c). It was also confirmed that the hybrid nanomembranes attached on paper clip-wires pass through ethanol/air interface without structural deformation (FIG. 7). This stability indicates that the hybrid nanomembranes are very robust and strong despite their nanoscale thickness and low area density of ~15 µg/cm$^2$.

Figure 8:
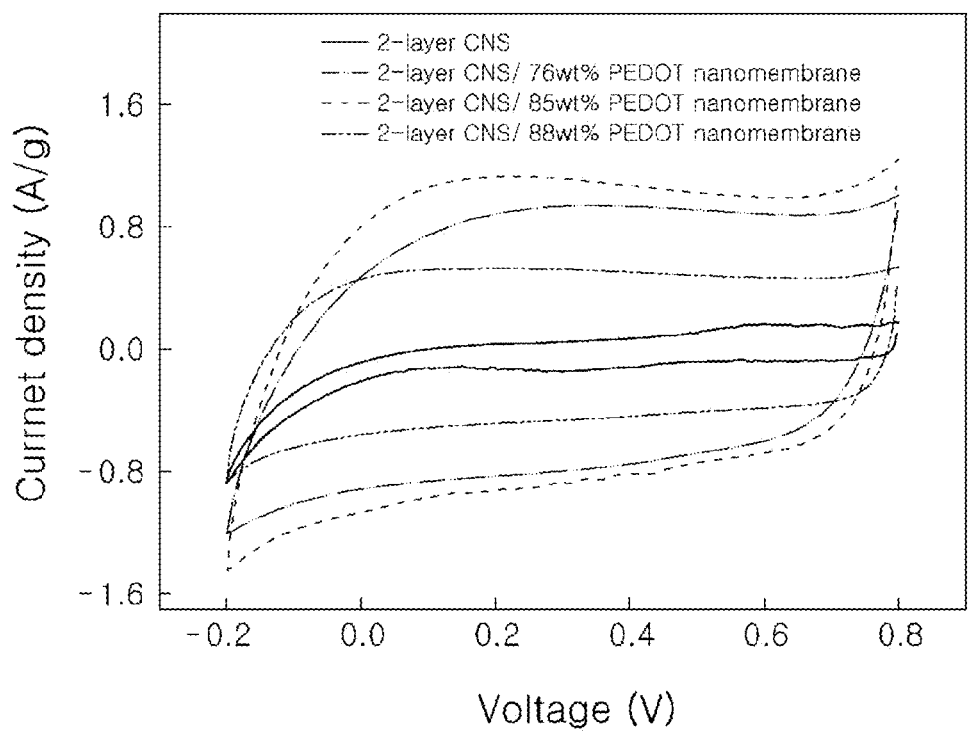
FIG. 8 shows cyclic voltammograms (current density versus voltage) for bare CNSs and hybrid nanomembranes with various PEDOT concentrations, in which the hybrid nanomembrane with 85 wt % PEDOT showed maximum specific capacitance and the scan rate was 10 mV/s.

Example 2: Determination of Transparent and Hybrid Nanomembranes' Performance for Supercapacitors For determining transparent and hybrid nanomembranes' performance for supercapacitors, the electrochemical capacitance of three-electrode cells consisting of hybrid nanomembranes (working electrode), Pt mesh (counter electrode), and Ag/AgCl (reference electrode) in 1M sulfuric acid was measured, as shown in FIG. 3. The present inventors focused on hybrid nanomembranes with 85 wt % PEDOT because this weight ratio gave the highest electrochemical capacitance (FIG. 8). FIG. 3a shows the results of typical CV measurements of hybrid nanomembranes and 2-layer CNS. The rectangular shapes of the CV curves in the potential range of −0.2 to 0.8 V indicate a predominantly capacitive behavior of the hybrid nanomembranes.

The specific capacitance was obtained using $(I_a+|I_c|) \times \Delta t/(2\, m\Delta V)$, where $I_a$ and $I_c$ are the anodic and cathodic voltammetric current on the anodic and cathodic scans, $\Delta t$ is scanning time, m is the mass of the hybrid nanomembrane, and $\Delta V$ is the potential range of the CV. The 1 and 2-layer CNS/85 wt % PEDOT nanomembranes had electrochemical capacitance values of 62 F/g and 84 F/g at a scan rate of 10 mV/s, respectively. These values were ~8 and ~10 times higher than that of 2-layer CNS. The high capacitance is related to high pseudo-capacitance of PEDOT and effective hybridization of PEDOT and individual CNTs composing CNSs.

The galvanostatic charge/discharge curves for hybrid nanomembranes are shown in FIG. 3b. The specific capacitance was also calculated from the discharge curves according to $(I \times t_d)/(m \times V)$, where I is the discharge current, $t_d$ is the discharging time, m is the weight of the active material, and V is potential range. 1 and 2-layer CNS/85 wt % PEDOT nanomembranes had capacitance values of 89 and 106 F/g, which were obtained at current densities of 0.14 and 0.16 A/g, respectively.

Figure 9:
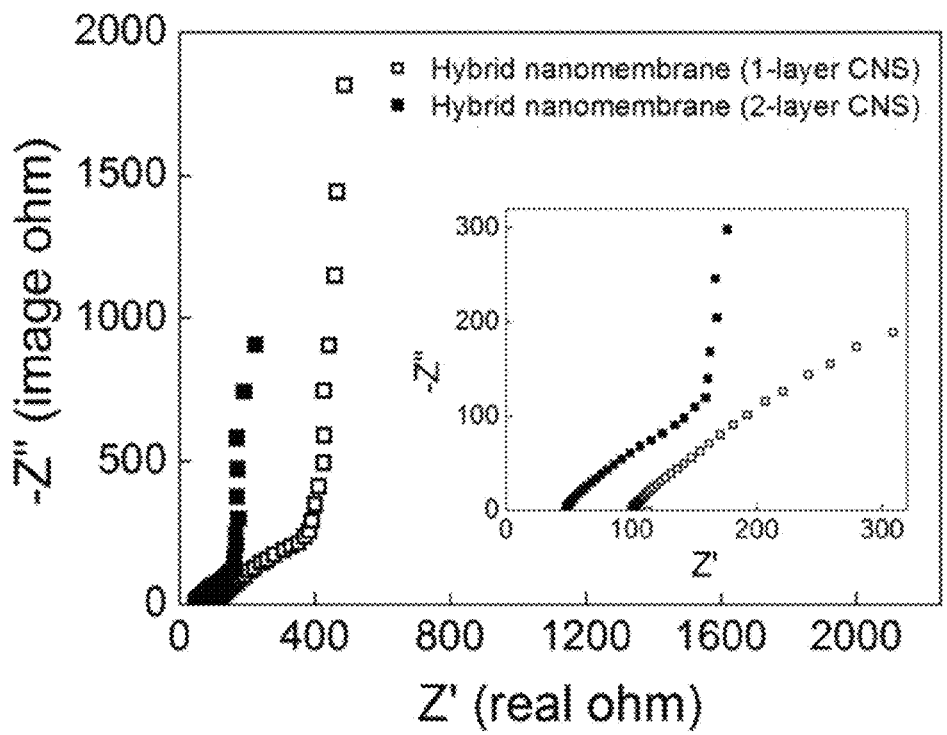
FIG. 9 shows Nyquist plots for 1 and 2-layer CNS hybrid nanomembranes with 85 wt % PEDOT, in which the inset is a magnified image in high frequency region.

The capacitance values obtained from the galvanostatic charge/discharge curves were 20-30% higher than those calculated from CV curves. IR drops of 1 and 2-layer CNS/85 wt % PEDOT nanomembranes were 70 and 10 mV, respectively. The smaller IR drop of the hybrid nanomembrane with 2-layer CNS was attributed to its lower equivalent series resistance (ESR) value, and the ESR values were confirmed from Nyquist plots of hybrid nanomembranes (1-layer CNS/85 wt % PEDOT: 102 Ohm, 2-layer CNS/85 wt % PEDOT: 49 Ohm) (FIG. 9).

Generally, electrochemical capacitance increases with the increase of electrolyte temperature. Experiments were carried out at 58° C. because electrical properties of the PEDOT are maintained until 60° C. Temperature of an electrolyte (1M $H_2SO_4$) was slowly elevated for 3 hours to reach the equilibrium state. At 58° C. the specific capacitance of 1-layer CNS/85 wt % PEDOT nanomembrane measured at 10 mV/s was ~72 F/g, and this value was ~50% higher than that measured at room temperature at the same scan rate (~48 F/g) (FIG. 3c). The energy density and the power density of hybrid nanomembrane were ~20 Wh/kg and ~1950 W/kg at 58° C., respectively.

Fast charging response was achieved by laminating the hybrid nanomembrane on a highly conducting current collector, such as glassy carbon. Without the current collector, the free-standing hybrid nanomembranes showed a diminishing capacitance with increasing voltage scan rate (FIG. 3c).

In contrast, the nanomembranes attached to the glassy carbon electrode maintained their high electrochemical capacitance in scan rates between 5 and 50 mV/s without dramatic decrease of capacitance (FIG. 3d).

Figure 10:
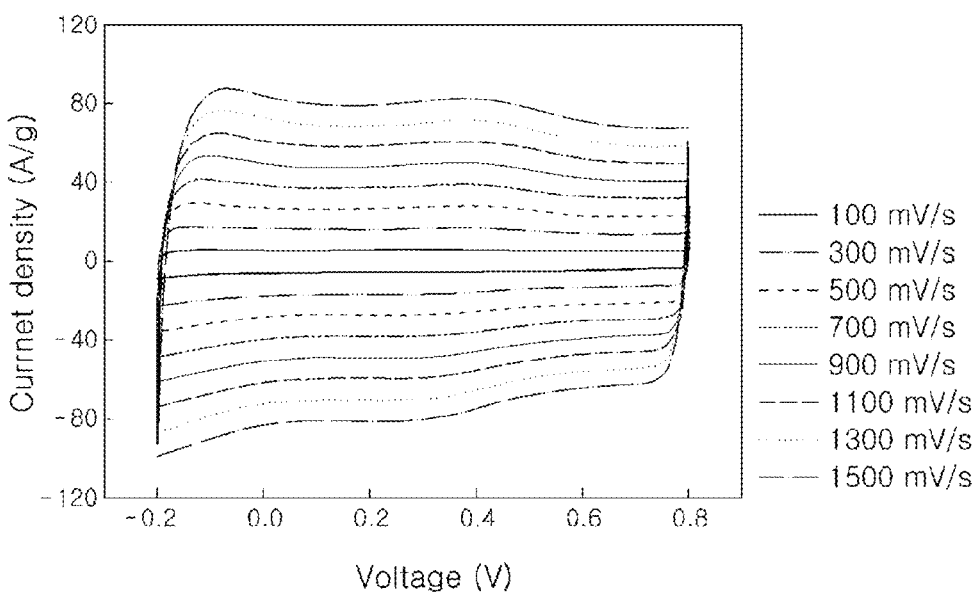
FIG. 10 shows cyclic voltammograms (current density versus voltage) for 1-layer CNS/85 wt % PEDOT nanomembranes attached on a glassy carbon showing rectangular shapes in high scan rates ranging from 100 to 1500 mV/s.

The 1-layer CNS/85 wt % PEDOT nanomembrane attached on a glassy carbon also showed rectangular shapes of CV curves in high scan rates ranging from 100 to 1500 mV/s (FIG. 10). At 5 and 1500 mV/s, the specific capacitances of hybrid nanomembrane were ~64 and ~50 F/g, respectively, and the hybrid nanomembrane on a current collector showed decrease of ~22% in capacitance. Thereby, the hybrid nanomembranes can have superior capacitance performance on transparent and conductive electrodes such as indium tin oxide glass, suggesting that they can be used as transparent supercapacitors.

What is claimed is:

1. A method for fabricating a hybrid nanomembrane in which a conducting polymer is coated on carbon nanotube sheets, the method comprising
    1) allowing an oxidant solution comprising Fe(III)PTS, pyridine and butanol to flow on carbon nanotube sheets, and completely evaporating the butanol, and
    2) adding a monomer for a conducting polymer polymerization to the carbon nanotube sheets stained with the oxidant solution free from butanol, followed by vapor phase polymerization in a sealed state.

2. The method according to claim 1, further comprising 3) rinsing the hybrid nanomembrane to remove unreacted oxidants after step 2).

3. The method according to claim 1, wherein the carbon nanotube sheets are densified sheets formed by evaporating an alcohol from carbon nanotube aerogel sheets.

4. The method according to claim 1, wherein the monomer for the conducting polymer is ethylenedioxythiophene (EDOT).

5. The method according to claim 1, wherein the concentration of the Fe(III)PTS in the oxidant solution is from 6 to 20% by weight, based on the weight of the butanol.

6. The method according to claim 1, wherein, in step 1), the alcohol is evaporated at 40 to 60° C.

7. The method according to claim 1, wherein, in step 2), the polymerization is carried out at around 60° C.

* * * * *